United States Patent
Miller et al.

(10) Patent No.: US 6,553,036 B1
(45) Date of Patent: *Apr. 22, 2003

(54) METHOD AND APPARATUS FOR PRESERVING LOOP FAIRNESS WITH DYNAMIC HALF-DUPLEX

(75) Inventors: Michael H. Miller, Eden Prairie, MN (US); Judy Lynn Westby, Bloomington, MN (US)

(73) Assignee: JPMorgan Chase Bank, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/567,174

(22) Filed: May 8, 2000

Related U.S. Application Data (63) Continuation of application No. 09/256,108, filed on Feb. 24, 1999, now Pat. No. 6,061,360.
(60) Provisional application No. 60/075,797, filed on Feb. 24, 1998.

(51) Int. Cl.[7] ................................................ H04J 3/02
(52) U.S. Cl. ..................... 370/462; 370/235; 370/414; 370/416; 370/418; 370/461; 710/240
(58) Field of Search ................................. 370/401, 402, 370/403, 404, 405, 414, 416, 418, 452, 455, 461, 462, 235, 236, 237, 354, 355; 455/403, 404; 710/100, 107, 240, 241, 242, 243, 244, 305

(56) References Cited

U.S. PATENT DOCUMENTS

| | | | | | |
|---|---|---|---|---|---|
| 5,379,386 | A | * | 1/1995 | Swarts et al. | 395/325 |
| 5,634,015 | A | * | 5/1997 | Chang et al. | 395/309 |
| 5,751,715 | A | * | 5/1998 | Chan et al. | 370/452 |
| 5,838,248 | A | * | 11/1998 | Nagano | 370/237 |
| 6,061,360 | A | * | 5/2000 | Miller et al. | 370/455 |
| 6,076,131 | A | * | 6/2000 | Nugent | 370/354 |
| 6,118,776 | A | * | 9/2000 | Berman | 370/401 |
| 6,298,405 | B1 | * | 10/2001 | Ito et al. | 710/107 |

* cited by examiner

*Primary Examiner*—Dang Ton
*Assistant Examiner*—Shick Hom (57) ABSTRACT

A method and apparatus for preserving loop fairness. Some embodiments include a dynamic half-duplex feature. One aspect includes a communications channel system and method for preserving loop fairness that includes a first channel node having one or more ports, each port supporting and attached to a fibre-channel arbitrated-loop serial communications channel. One of the ports will arbitrate for control of that port's attached channel, wherein control of the channel loop, once arbitration is won, a fairness-preserving apparatus causes control of the communications channel to be released based at least in part on whether a predetermined amount of use has occurred between the first port and the communications channel. In some embodiments, the predetermined amount of use includes a transfer of a first predetermined amount of data. In some embodiments, release of control of the channel is inhibited if less than a second predetermined amount of data remains to be transferred.

25 Claims, 5 Drawing Sheets

METHOD AND APPARATUS FOR PRESERVING LOOP FAIRNESS WITH DYNAMIC HALF-DUPLEX

This is a continuation of U.S. patent application Ser. No. 09/256,108, filed Feb. 24, 1999, now U.S. Pat. No. 6,061, 360 which claimed priority under 35 U.S.C. 119(e) of U.S. Provisional Application Ser. No. 60/075,797, filed Feb. 24, 1998, which applications are incorporated herein by reference.

RELATED APPLICATIONS

This application claims the benefit under 35 U.S.C. 119(e) of U.S. Provisional Application Ser. No. 60/075,797 filed Feb. 24, 1998.

FIELD OF THE INVENTION

The present invention relates to the field of mass-storage devices. More particularly, this invention relates to an improved fibre-channel arbitrated-loop ("FC-AL") apparatus and method to method and apparatus for preserving loop fairness with a dynamic half-duplex mode of data transmission.

BACKGROUND OF THE INVENTION

One key component of any computer system is a device to store data. Computer systems have many different devices where data can be stored. One common place for storing massive amounts of data in a computer system is on a disc drive. The most basic parts of a disc drive are a disc that is rotated, an actuator that moves a transducer to various locations over the disc, and circuitry that is used to write and read data to and from the disc. The disc drive also includes circuitry for encoding data so that it can be successfully retrieved from and written to the disc surface. A microprocessor controls most of the operations of the disc drive, in addition to passing the data back to the requesting computer and, taking data from a requesting computer for storing to the disc.

The interface for transferring data between the disc drive and the rest of the computer system is typically a bus or channel, such as the Small Computer Systems Interface ("SCSI"), or the Fibre Channel. Certain aspects of such interfaces are often standardized in order that various devices from different manufacturers can be interchanged and all can be connected to a common interface. Such standards are typically specified by some standards committee of an organization such as the American National Standards Institute ("ANSI").

One standardized interface for exchanging data between various storage devices and various computers is the fibre channel. In some embodiments, the fibre-channel standard includes arbitrated loops (described further below). In some embodiments, the fibre-channel standard supports a SCSI-like protocol for controlling data transfers.

Fibre channels represent significant advantages over Small Computer Standard Interface ("SCSI") designs. Fibre channels provide significantly higher bandwidths, currently up to about 106 megabytes per second, compared to between two and twenty megabytes per second for traditional SCSI designs. Fibre channels provide greater connectivity in that up to one-hundred twenty-six devices (including the host) may be connected, as compared to a maximum of seven or fifteen devices in typical SCSI environments. The fibre channel can be attached with a single connector and does not require a switch. A fibre channel using coaxial electrical conductors operates at distances of up to thirty meters between devices, and up to ten kilometers using fibre optics for an entire channel, as compared to a maximum total length of up to twenty-five meters for SCSI environments.

In SCSI environments, errors in data transmission are detected through use of parity, whereas in fibre channels, errors are identified by a running disparity and cyclic-redundancy-code check ("CRC check") information. More information can be found in U.S. Pat. No. 5,802,080 entitled "CRC Checking Using a CRC Generator in a Multi-port Design," and U.S. Pat. No. 5,663,724 entitled "16B/20B Encoder," both by the present inventor, Westby, and commonly assigned to the present assignee Seagate Technology, Inc.

The fibre-channel arbitrated loop ("FC-AL") is an industry-standard system employing a byte-oriented DC-balanced (0,4) run-length-limited 8B/10B-partitioned block-transmission code scheme. The FC-AL operates at a clock frequency of 106.25 MHZ. One form of an 8B/10B encoder/decoder is described in U.S. Pat. No. 4,486,739 granted Dec. 4, 1984 for "Byte Oriented DC Balanced (0,4) 8B/10B Partitioned Block Transmission Code" by Franaszek et al.

A fibre-channel arbitrated loop ("FC-AL") allows for multiple devices, each called "a node," to be connected together. A node may be any device (a computer, workstation, printer, disc drive, scanner, etc.) of the computer system having an interface allowing it to be connected to a fibre-channel "topology" (defined just below). Each node has at least one port, called an NL port ("node-loop port") to provide access to other nodes. The components that connect two or more ports together are collectively called a "topology" or a "loop." Each node communicates with all other nodes within the provided topology or loop.

Ports are the connections in a fibre-channel node, though which data may pass over the fibre channel to ports of other nodes (the outside world). A typical fibre-channel drive has two ports packaged within the drive's node. Each port includes a pair of "fibers"—one to carry information into the port and one to carry information out of the port. Each "fiber" is a serial data connection, and, in one embodiment, each fiber is actually a coaxial wire (e.g., coaxial copper conductors, used when the nodes are in close proximity to one another); in other embodiments, a fiber is implemented as an optical fiber for at least some of its path (e.g., when nodes are separated by an appreciable distance, such as nodes in different cabinets or, especially, different buildings). The pair of fibers connected to each port (one carrying data into the port, the other carrying data out from the port) is called a "link" and is part of each topology. Links carry information or signals packaged in "frames" between nodes. Each link can handle multiple types of flames (e.g., initialization, data, and control frames).

Since each fiber carries data in-one direction only, nodes are connected to one another along a loop, wherein the nodes must arbitrate for control of the loop when they have data to transfer. "Arbitration" is the process of coordinating the nodes to determine which one has control of the loop. Fibre-channel arbitrated loops attach multiple nodes in the loop without hubs or switches. The node ports use arbitration operations to establish a point-to-point data-transfer circuit. FC-AL is a distributed topology where each port includes at least the minimum necessary function to establish the circuit. The arbitrated-loop topology is used to connect any number of nodes between two and one-hundred twenty-six (126) node ports.

In some embodiments, each node includes dual ports (each connected to a separate loop) which provide redundancy, so that if one loop fails, the other one can fulfill the loop duties. Dual ports also allow two hosts (e.g., two host computers) to share a single drive.

Fairness Background

"Fairness" in the context of the present invention is a mode of operation wherein a shared resource, such as a Fibre Channel loop, is made available on a timely basis to each of a plurality of users, such as to each of a plurality of disc drives 100; i.e., without undue delay, and for an amount of time proportional to the amount of data each disc drive 100 needs to transfer. "Playing unfair" is a mode of operation wherein one user, for example one disc drive, will take control of the shared resource, for example the Fibre Channel loop, either too often or for too long a period of time, thus depriving other disc drives that need to use the loop of its use.

"Fairness" allows each port to gain access to the loop (based on priority) and transmit as much information as it wants (no time limit). It must then wait to arbitrate gain until all other ports have used their access.

The protocol for the Loop permits each L Port (also called a loop port; an L_Port can be either a normal loop port "NL_Port" or a fabric-loop port "FL_Port" that is used generally to interconnect two loops to one another) to continuously arbitrate to access the Loop. A priority is assigned to each participating L-port based on the Arbitrated Loop Physical Address (AL_PA). As with other prioritized protocols, this could lead to situations where the lower priority L_Ports cannot gain access to the Loop. The access fairness algorithm sets up an access window in which all L_Ports are given an opportunity to arbitrate and win access to the Loop. When all L_Ports have had an opportunity to access the Loop once, a new access window is started. An L_Port may arbitrate again and eventually win access to the Loop in the new access window. Not every L_Port is required to access the Loop in any one access window.

When an L_Port which uses the access fairness algorithm has arbitrated for and won access to the Loop, the L_Port shall not arbitrate again until at least one Idle has been transmitted by the L_Port. The time between the first L_Port to win arbitration and transmitting an Idle is an access window. A special arbitration Primitive Signal (i.e., ARB(F0)) is used to prevent an early reset of the access window. The details of the access fairness algorithm are contained in the Fibre-Channel FC-AL Specification (ANSI Standards: Fibre Channel FC-AL X3T11/Project 960D/Rev. 4.5 and Fibre Channel FC-AL2 X3T11/Project 1133D/Rev. 6.3).

The access fairness algorithm does not limit the time that an L_Port controls the Loop once it wins arbitration, just as ANSI X3.230, FC-PH does not limit the time for a Class 1connection. However, if access is denied longer than E_D_TOV, the access window is reset and an L_Port may begin arbitrating.

Although all L_Ports shall implement the fairness algorithm, neither FL_Ports nor NL_Ports are required to use the fairness algorithm at all times. For example, if one L_Port requires more Loop accesses than the other L_Ports, that L_Port may choose to be unfair.

To provide equal access to the Loop for all L_Ports, it is recommended that each L Port use the access fairness algorithm. When an L_Port is using the access fairness algorithm, it is called a "fair" L_Port.

When a fair L_Port has arbitrated for and won access to the Loop and does not detect that another L_Port is arbitrating, that L_Port may keep the existing circuit open indefinitely or close that circuit and retain ownership of the Loop (i.e., without re-arbitrating) to open another L_Port on the Loop.

When a fair L_Port has access to the Loop and detects that another L_Port is arbitrating, the L_Port may close the Loop at the earliest possible time. The L_Port shall close the Loop and arbitrate again in the next access window before opening a different L_Port.

The configuration of some Loops may require that certain L_Ports have more access to the Loop than just once per access window. Examples of these L_Ports include, but are not limited to, a subsystem controller or a file server.

An L_Port may be initialized (or may temporarily choose) not to use the access fairness algorithm. When an L_Port is not using the fairness algorithm, it is called an "unfair" L_Port. The decision whether to participate in access fairness is left to the needs of the implementation.

When an unfair L_Port has arbitrated for and won access to the Loop and does not detect that another L_Port is arbitrating, that L_Port may keep the existing circuit open indefinitely or close that circuit and retain ownership of the Loop (i.e., without re-arbitrating) to open another L_Port on the Loop.

When an unfair L_Port controls the Loop and detects that another L_Port is arbitrating, the unfair L_Port may close the Loop at the earliest possible time. The unfair L_Port may retain ownership of the Loop (i.e., without re-arbitrating) and open another L_Port on the Loop.

A participating FL_Port is always the highest priority L_Port on the Loop based on its AL_PA. An FL_Port is exempted from using access fairness algorithm because the majority of its traffic is with the rest of the Fabric.

When an FL_Port controls the Loop and detects that another NL_Port is arbitrating, the FL_Port may close the Loop at the earliest possible time. Because the FL_Port has the highest priority and is exempted from fairness, it will always win arbitration. Therefore, if communication is required with another NL_Port, the FL_Port may retain its access to the Loop (i.e., without re-arbitrating) and open another NL_Port on the Loop.

There is, therefore, a need for an arrangement to preserve loop fairness, particularly in fibre-channel embodiments that include a dynamic half-duplex feature.

SUMMARY OF THE INVENTION

A method and apparatus is described for preserving loop fairness. Some embodiments include a dynamic half-duplex feature. One aspect of the present invention includes a communications channel system for preserving loop fairness that includes a first channel node having one or more ports, each port supporting and attached to a fibre-channel arbitrated-loop serial communications channel. One of the ports will arbitrate for control of that port's attached channel, wherein control of the channel loop, once arbitration is won, a fairness-preserving apparatus causes control of the communications channel to be released based at least in part on whether a predetermined amount of use has occurred between the first port and the communications channel.

Another aspect of the present invention provides a communications method that includes arbitrating for control of a loop of a fibre-channel arbitrated-loop serial communications channel; and releasing control of the communications channel based at least in part on whether a predetermined amount of use has occurred between the first port and the communications channel.

In some embodiments of the above system and method, the predetermined amount of use includes a transfer of a first predetermined amount of data. In some such embodiments, release of control of the channel is inhibited if less than a second predetermined amount of data remains to be transferred.

DETAILED DESCRIPTION

In the following detailed description of the preferred embodiments, reference is made to the accompanying drawings which form a part hereof, and in which are shown, by way of illustration, specific embodiments in which the invention may be practiced. It is to be understood that other embodiments may be utilized and structural changes may be made without departing from the scope of the present invention.

The invention described in this application is useful for all types of disc drives, including hard-disc drives, ZIP drives, floppy-disc drives, optical-disc drives, CDROM ("compact-disc read-only memory") drives, and any other type of drives, systems of drives (such as a "redundant array of inexpensive/independent disc drives," or RAID, configuration) or other devices, where data are communicated between drives and other devices or information-handling systems. In some embodiments, the present invention is useful in node interfaces for non-disc devices, such as hubs and switches (such as are used to connect plural fibre-channel loops to one another), workstations, printers, and other devices or information-handling systems that are connected on a fibre-channel arbitrated loop.

Figure 1:
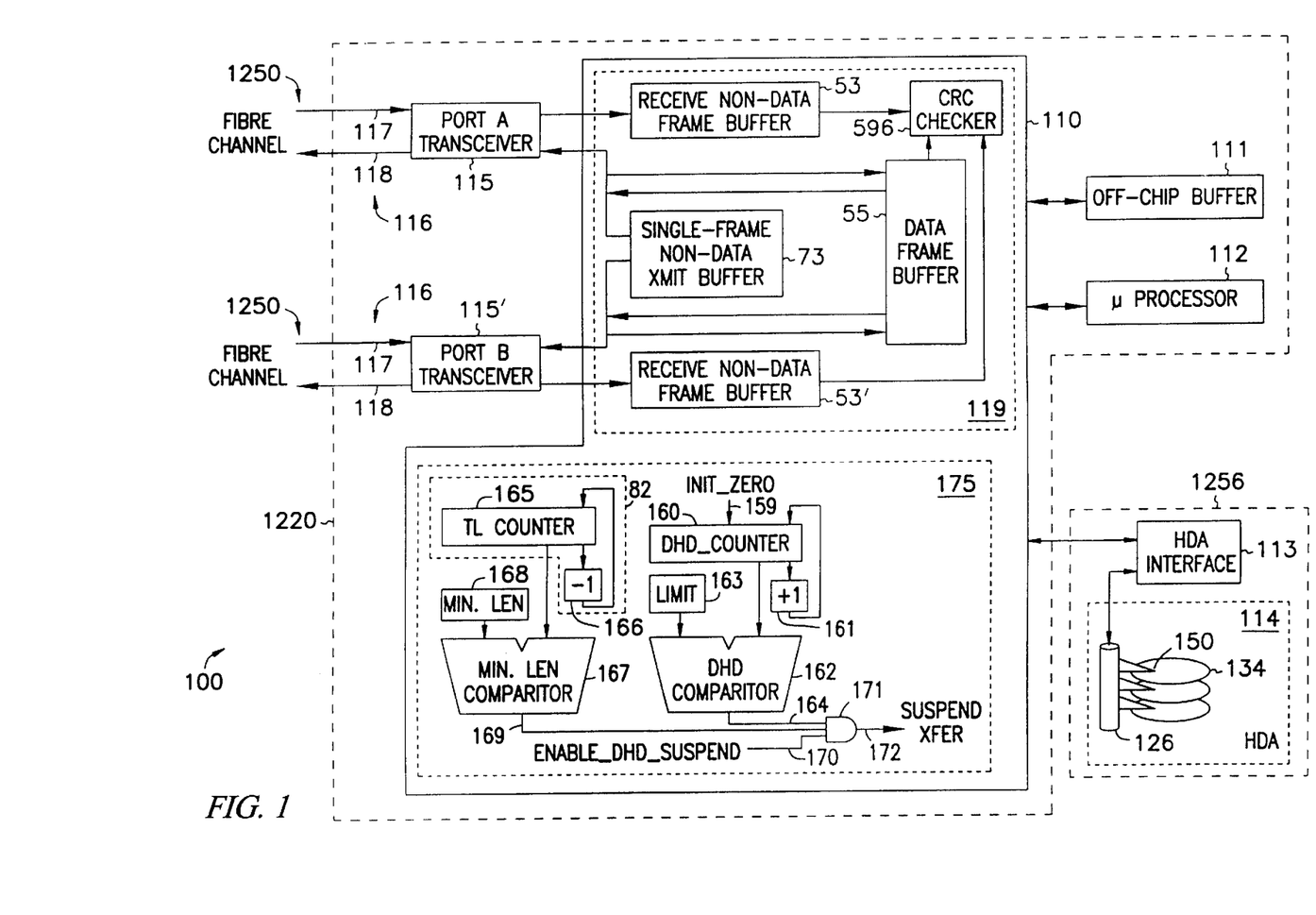
FIG. 1 is a block diagram of a disc drive 100 with a fibre-channel node interface.

FIG. 1 shows a block diagram of a disc-drive device 100 with a fibre-channel node interface. More information can be found in U.S. patent application Ser. No. 09/193,387 entitled "Method and Dedicated Frame Buffer for Loop Initialization and Responses."

Figure 2:
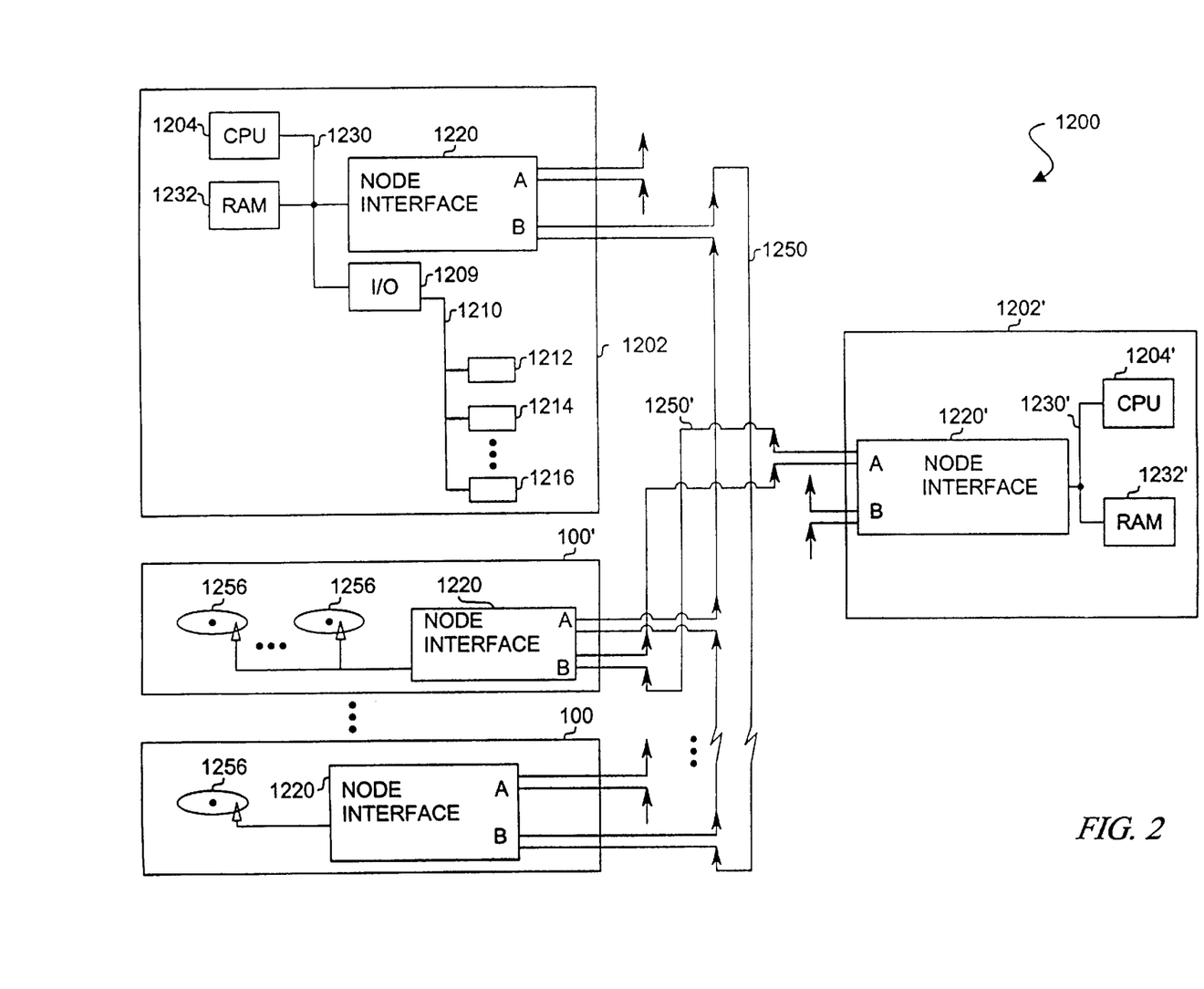
FIG. 2 is a block diagram of an information-handling system 1200 incorporating the present invention.

Referring to FIG. 2 as well as FIG. 1, a fibre-channel loop-interface circuit 1220 (also called node interface 1220) includes a dedicated transmit-frame buffer 73 for loop initialization and responses. In one embodiment, each node interface 1220 includes two ports 116 (designated port A and port B). ("Loop initialization" is accomplished by transmitting a sequence of one or more specialized non-data frames (and monitoring responses to those frames) to initialize a fibre-channel loop. "Responses" are non-data frames sent in response to commands or inquiries from other nodes.) The fibre-channel arbitrated-loop communications channel 1250 (also called a loop 1250, or fibre-channel loop 1250) can be used to communicate data between disc-storage devices 100 and computers (or other information-handling systems) 1202 or other information-handling devices. In one embodiment, fibre-channel loop 1250 is a serial communications channel; in other embodiments two or more parallel lines (or "fibers") are used to implement fibre-channel loop 1250. Having such a dedicated transmit-frame buffer 73 allows one port 116 of a dual-port node 1220 to be transmitting initialization or response frames while another port is transmitting or receiving data frames. The ports 116 are serial lines, one line 117 for inbound data, and another line 118 for outbound data, both lines 117 and 118 connecting to, and forming part of, communications channel loop 1250. Dedicated receive buffers (53, 53' and 55) are also provided for each port 116 of a two-port node. (Note that each block having a reference numeral with a prime (e.g., 53') provides the same function as the corresponding block without the prime (e.g., 53), but is used for a separate loop port or communications channel.) Cyclic-redundancy-code information received from the fibre channel 1250 along with a frame is stored in one of one or more frame buffers (53, 53' or 55), and later checked to ensure the integrity of the data while in the frame buffer (53, 53' or 55). Control of a loop 1250 is maintained (i.e., the loop connection is held open) as long as a programmable amount of data is available for transmission, in order to reduce the overall amount of time spent arbitrating for control of the loop 1250.

In some embodiments, disc drive 100 includes a magnetic-storage head-disc assembly ("HDA") 114 having one or more disc platters 134, one or more magnetic read/write transducers 150 per disc platter, and an arm actuator assembly 126. Signals between the transducers (or "heads") and HDA interface 113 transfer data to and from the disc platters 134. Thus, the "disc drive" of some embodiments (e.g., disc drive 1256 of FIG. 1) includes HDA 114 and HDA interface 113 (e.g., a conventional SCSI drive), and one or more such conventional disc drives 1256 is connected to an external node interface 1220 in order to connect to a loop or fibre-channel topology, as shown in FIG. 1. In other embodiments, a "disc drive" is typified by the disc drive 100 of FIG. 2, and includes a node interface 1220 integrated with the disc drive 1256 in overall disc drive 100. In one embodiment, data are in turn transferred from and to off-chip buffer 111. The invention provides a dedicated on-chip buffer 119, which, in the embodiment shown, includes a receive-non-data-fame buffer 53 (alternately called an "inbound non-data buffer 53") for each port (i.e., buffers 53 and 53'), a transmit-frame buffer 73 which, in one embodiment, can be used simultaneously by both ports (in other embodiments, a single buffer is used by only one port at a time), and a shared data-frame buffer 55, along with a CRC checker 596.

In one embodiment, loop-port transceiver blocks 115 (i.e., 115 and 115') include port transceivers which serialize and deserialize data transfers through Port A and Port B to the fibre-channel loops 1250 (see FIG. 2) connected thereto. In some embodiments, transceivers 115 are implemented as external transceivers; in other embodiments, these transceivers are located on-chip in block 110. In some embodiments, the right-side interfaces (i.e., right side relative to the transceiver 115 or 115' of FIG. 1) are parallel input-output signals that are ten bits wide; in other embodiments, they are twenty bits wide. Together, blocks 110, 111, 112, port-A transceiver 115 and port-B transceiver 115' form fibre-channel node interface 1220. In some embodiments, port transceivers 115 and 115' are integrated within a single chip 110. In other embodiments, the transceivers 115 and 115', including their serializer/deserializer functions are implemented on circuits separate from chip 110.

In other embodiments, transceivers 115 are merely interfaces between the serial loop 1250 and chip 110, wherein the serialization/deserialization to ten-bit wide or twenty-bit-wide data occurs on-chip.

FIG. 2 is a schematic view of a computer system 1200. Advantageously, the present invention is well-suited for use in computer system 1200. Computer system 1200 may also be called an electronic system or an information-handling system and includes a central processing unit ("CPU"), a memory and a system bus. Computer system 1200 includes a CPU information-handling system 1202 having a central processing unit 1204, a random-access memory ("RAM") 1232, and a system bus 1230 for communicatively coupling the central processing unit 1204 and the random-access memory 1232. The CPU information-handling system 1202 includes the fibre-channel node interface 1220. Each one of the one or more disc-storage information-handling systems 100 through 100' includes one or more disc-drive device 1256 and a fibre-channel node interface 1220.

In some embodiments, multiple disc drives 1256 are connected to a single node interface 1220, for example in a RAID (redundant array of inexpensive/independent disc drives) configuration, such that device 100' is a RAID array of disc drives. The CPU information-handling system 1202 may also include an input/output interface circuit 1209 that drives an internal input/output bus 1210 and several peripheral devices, such as 1212, 1214, and 1216, that may be attached to the input/output bus 1210. Peripheral devices may include hard-disc drives, magneto-optical drives, floppy disc drives, monitors, keyboards and other such peripherals. Any type of disc drive or other peripheral device may use the fibre-channel methods and apparatus (especially, e.g., the improvements in fibre-channel node interface 1220) described herein. For each device, either the A port or the B port can be used to connect to any given loop 1250.

One embodiment of system 1200 optionally includes a second CPU information-handling system 1202' (which is identical or similar to system 1202) having central processing unit 1204' (which is identical to central processing unit 1204), a random-access memory ("RAM") 1232' (which is identical to RAM 1232), and a system bus 1230' (which is identical to system bus 1230) for communicatively coupling central processing unit 1204' and random-access memory 1232'. CPU information-handling system 1202' includes its own fibre-channel node interface 1220' (which is identical to node interface 1220), but is connected to one or more disc systems 100 (in this illustrated example, it is just connected to disc system 100', but in other examples is connected to all devices or disc systems 100 through 100') through a second fibre-channel loop 1250' (separate and independent from loop 1250). This configuration allows the two CPU information-handling system 1202 and 1202' to share one or more of the disc systems 100 using separate fibre-channel loops for each CPU information-handling system 1202. In yet other embodiments, all devices 100 through 100', and all CPU information-handling systems 1202 through 1202', are connected to both loops 1250 and 1250'.

The Fibre-Channel Specifications used in building one embodiment of the present invention include the following ANSI Standards:

| Fibre Channel FC-PH | X3T11/Project 755D/Rev. 4.3 Physical & Signaling Interface |
|---|---|
| Fibre Channel FC-AL | X3T11/Project 960D/Rev. 4.5 Arbitrated Loop |

-continued

| Fibre Channel FC-AL2 | X3T11/Project 1133D/Rev. 6.3 Arbitrated Loop |
|---|---|
| Fibre Channel FCP Protocol for SCSI | X3T10/Rev. 012 X3.2 69-199X |

I. Preserving Loop Fairness with Dynamic Half-Duplex

One embodiment of the present invention provides a fairness-preserving apparatus 175 and method for preserving (or, equivalently, for providing) loop fairness with a dynamic half-duplex ("DHD") command or instruction, and a method for providing fairness that uses the DHD command.

Although Fibre Channel is by nature a full-duplex link (frames may travel in both directions in the fibre pairs simultaneously), some Loop Port (L_Port) implementations can only support one-directional data transfer. Even when a port is capable of full-duplex operation, there are situations where loop arbitration may be reduced.

Dynamic Half-Duplex (DHD) is a loop primitive that is transmitted on a Loop by a port in the OPEN state to indicate to the port in the OPENED state that it has no more frames to transmit. DHD may allow ports to make more efficient use of the established circuit by:

1. allowing a port which is only capable of half-duplex data transfers to transfer frames in the opposite direction without re-arbitrating.
2. allowing a port which is in the OPENED state to transmit all frame even though the port in the OPEN state has finished its data transfer.

The port in the OPEN state normally transmits the first CLS to close the Loop. When a full-duplex circuit exists, the port in the OPENED state receives the CLS and may continue to transmit frames until it has no more Buffer-to-Buffer Credit (BB_Credit-R_Rdy's). Once the OPENED port is no longer able to transmit any frames, it must forward the CLS back to the OPEN port.

There are at least two cases where it may be useful to transfer the close initiative rather than transmitting CLS:

1. Some implementations are not able to handle simultaneous transmit and receive transfers at the node. Often these nodes have frames pending for the OPEN port, but because of their half-duplex design, cannot take advantage of the bidirectional circuit which exists.
2. Even if full-duplex transfers are possible, if the OPEN port transmits the CLS, the OPENED port can only transmit frames based on existing credit. (Example: A port is OPENED to receive a new command, receives 2R_Rdy's, and has read data for the OPEN port. The OPENED port can only transmit 2 data frames before it must close.)

To avoid this extra re-arbitration cycle, the DHD primitive signal is provided. DHD is transmitted by the OPEN L_Port instead of transmitting CLS. Transmitting the DHD allows the OPEN port to continue to transmit R_Rdy's and Link Control frames (but no data frames). The OPENED port remembers that it has received the DHD and holds the close initiative and is expected to transmit the first CLS when it has no more frames to transmit to the OPEN port. "Fairness" in this context is a mode of operation wherein a shared resource, such as Fibre Channel loop 1250, is made available on a timely basis to each of a plurality of users, such as disc drives 100; i.e., without undue delay, and for an amount of time proportional to the amount of data each disc drive 100 needs to transfer. "Playing unfair" is a mode of operation wherein one user, for example a port of CPU information-handling system 1202 (acting as an initiator), takes control of the shared resource without waiting for every other users to have a turn. Playing unfair is often desirable in certain such limited circumstances (e.g., allowing fast devices to take more turns than slow devices), because it allows, for example, CPU information-handling system 1202 to start operations on a large number of slower disc drives 100. Allowing one disc drive 100 to play unfair may allow data transfer from that device to complete sooner than otherwise, but generally results in poorer system performance, because other disc drives 100 will not get serviced and will not get freed up to perform other operations, and because the CPU information-handling system 1202 will have to wait too long to get that data from those other disc drives 100 (see FIG. 2).

In a Fibre Channel Arbitrated Loop design such as is addressed in the present invention, a loop port 1220 must arbitrate for access to the loop 1250. A priority system is used to determine which port 1220 gains control of the loop 1250 and a "fairness" scheme is used to assure that ports are not starved. As a target device, the disk drive 100 usually plays fair and is given a lower priority, which assures each drive 100 equal access to the loop 1250. Initiators (such as CPU information-handling system 1202) may play unfair to keep the drive queues full (drive queues are lists of pending and current operations that each disc drive 100 maintains for commands directed to it). An "initiator" is a device on a Fibre Channel loop that requests an input/output ("I/O") process that is to be performed by another device (called the "target").

"Full duplex" is a mode of operation wherein data is able to be transmitted out a port at the very same time that data is being received into that port 1220. "Half duplex" is a mode of operation wherein data is able to be transmitted out a port or received into that port, but only alternatively and not at the same time.

One aspect of the present invention is a feature called "Dynamic Half Duplex" that is added to the Fibre-Channel Arbitrated Loop architecture (FC-AL-2). Even when a port is capable of full-duplex operation (such as the design described below in sections II, III, IV, and V), there are situations where the number of loop arbitration cycles may be reduced by providing the DHD feature. For example, when an OPEN port (a port 116 that is in an OPEN state) transmits the CLS primitive signal, the OPENED port can only transmit frames based on existing credit. (For example, the A port 116 of a node interface 1220 is OPENED to receive a new command, it receives two R_RDY's, and has read data for the OPEN port. The OPENED port can only transmit two data frames before it must close.) With Dynamic Half Duplex, the OPEN port transmits the DHD primitive instead of the CLS and continues to transmit R_RDY's. This can allow the disc drive 100 that has read data to complete the transfer when a new command is received without even having to arbitrate for the loop. This DHD feature may reduce arbitration cycles but also may distort loop fairness.

For example, in a system 1200 (see FIG. 2) according to the present invention, an information-handling system 1202 sends a read operation command to disc drive 100 (which will return a plurality of data frames) and sends a DHD primitive signal (which will allow the disc drive 100 to keep control over the loop 1250 for an extended period of time in order to complete transfer of a large number of data frames without giving up control and then having to re-arbitrate for control of the loop 1250). Thus, because the disc drive 100 that has received the DHD primitive signal is allowed to use the re-arbitration window again even though it had previously won arbitration and was waiting for the next fairness window. The fairness of the loop (the ability for all devices to have equal access to the loop resource) is distorted.

The initiator information-handling system 1202 (see FIG. 2) that has a higher-priority address and plays unfair (i.e., by using its high-priority address to take control of the loop at the expense of other devices with lower priority addresses, even though they may have been waiting their turn for a longer time) wins arbitration and sends a new command (e.g., a DHD command) to a drive 100. The drive 100 has been arbitrating for the loop 1250 because it has read data for the initiator 1202. When the drive 100 receives the DHD command, it is allowed to send all of its data frames and the response that completes the operation. Other drives (e.g., drive 100') that did not get opened with a new command must wait until they "fairly" win arbitration. In the meantime, the drive 100 that finished the command could have read data for the next command. Since the previous command completed, the initiator 1202 may send that drive 100 a new command to keep its queue full. The new command could allow the drive 100 to complete another read transfer. Over time, some drives may get "starved" for access to the loop 1250 and finish fewer commands than those that made use of receiving the DHD.

The improved fairness-preserving feature of the present invention limits the length of time that one node 116 is allowed to keep control of loop 1250, thus assuring that other nodes 116 get a turn within a reasonable amount of time (thus avoiding "starvation". In one embodiment, the length of time one node 116 is allowed to keep control over the loop is regulated by regulating the maximum number of frames transferred at any one operation. In one embodiment, if that node 116 is sufficiently near the completion of its data transfer, it is allowed to complete that transfer, even though it exceeds the maximum number of frames that would otherwise be allowed.

According to the present invention, in order to preserve loop fairness when using Dynamic Half Duplex, a numerical frame-limit feature is added to node interface 1220. In one embodiment, an upper numerical limit is placed on how many read data frames (i.e., data frames to be transmitted) are allowed to be transmitted after a device (e.g., disc drive 100) receives a DHD command (also called a DHD "primitive") unless the transfer is nearing completion. In some embodiments, the numerical limit is programmable and set either by a vendor-unique Log-in parameter (in one embodiment) or mode page setting (in another embodiment) or set to a default value via a microprocessor (in another embodiment). This allows an initiator 1220 to programmably tune the numerical limit value for the application (i.e., the software running in CPU information-handling system 1202) in which the drive 100 is used, or allow the drive to set a reasonable value.

In one embodiment, the present invention provides a fairness-preserving apparatus 175 as shown in FIG. 1. In one embodiment, a 16-bit counter 160 (also called herein dhd_cnt_out(15:0); see FIG. 1) is zeroed by init_zero signal 159 when the DHD is received and is incremented (using incrementor 161) for each frame transmitted. Comparitor 162 checks when the DHD counter 160 has reached the numerical limit value stored in limit register 163 (also called dhd_max_frms(15:0)) to decide when to suspend the data transfer (close the loop 1250). Comparator 162 outputs suspend_xfer signal 164. In one embodiment, suspend_xfer signal 164 causes suspension of the data-frame transmit operation, and temporary closing of the loop to allow other devices to use the loop 1250 (i.e., this embodiment ignores signal 169 and signal 170 described below, and suspends a transfer once the limit is reached by making suspend_xfer signal 172 equal to suspend_xfer signal 164). In another embodiment, an enable_DHD_suspend signal 170 for this preserving-fairness-apparatus 175 is also provided as an input to AND gate 171 (i.e., this embodiment ignores signal 169 described below, and suspends a transfer once the limit is reached if the enable signal 170 is also "on"; if enable signal 170 is "off" then the fairness-preserving feature 175 of the present invention is disabled).

In other embodiments, counter 160 is activated for other transfers of data (rather than only when DHD commands are received). In some embodiments, counter 160 replaced by a decrementing counter that is initialized by loading it with the value that is, in the above description, loaded into limit register 163; and this decrementing counter is decremented once for every frame transferred, and activates signal 164 once it reaches zero, thus providing the equivalent function to blocks 160, 161, 162, and 163 described above.

In some embodiments, counter 160 monitors the number of frames transferred, as described above. In other embodiments, counter 160 monitors the number of bytes, or words, or other measures of the amount of data transferred.

In still other embodiments, counter 160 is replaced by a timer which monitors the length of time that has passed during a transfer, and that activates signal 164 once a predetermined length of time has lapsed. This provides a similar function to that described above, but provides fairness based on a length of time rather than on an amount of data transferred. In some such embodiments, AND gate 171 is still used to inhibit suspend_xfer signal if fewer than a predetermined amount of data remains to be transferred, and/or if enable_DHD_suspend signal 170 is disabled.

In some embodiments, counter 165 monitors the number of frames transferred, as described above. In other embodiments, counter 165 monitors the number of bytes, or words, or other measures of the amount of data transferred.

In still other embodiments, counter 165 is replaced by a timer which monitors the length of time that has passed during a transfer, and that activates signal 169 once a predetermined length of time has lapsed. This provides a similar function to that described above, but provides fairness based on a length of time rather than on an amount of data transferred. In some such embodiments, AND gate 171 is still used to inhibit suspend_xfer signal if fewer than a predetermined amount of data remains to be transferred, and/or if enable_DHD_suspend signal 170 is disabled.

In one embodiment the transfer-length counter 165 logic uses number of words instead of frames.

While the above description is specifically drawn to embodiments that involve the dynamic half duplex feature, other embodiments of the present invention exist in which the fairness-preserving feature 175 of the present invention is provided independent of the DHD feature. For example, in some embodiments, the fairness-preserving feature 175 is provided but the DHD feature is not provided. In other embodiments both are provided, but the fairness-preserving feature is used both when the DHD command has been received, and in certain other situations as well, in order to enhance fairness to those situations. For example, in one embodiment, transfers of write data from information-handling system 1202 to disc drive 100

In one embodiment, a transfer-length counter 165 (also called xfr_cnt_out(26:0)) is provided. Transfer-length counter 165 is decremented by logic 166 to indicate the remaining number of words to transmit; together transmit-length counter 165 and decrementor 166 form a Data-transmit frame-length counter 82. This embodiment compares the count of remaining words in transfer-length counter 165 against a programmable value held in minimum-length register 168 (also called dhd_cmpl_len (26:0)) to block suspension of the transfer if the transfer is nearing completion (i.e., the transfer is defined as "nearing completion" if there are fewer words remaining to be transferred than the value held in minimum-length register 168). In one embodiment, AND gate 171 forms a logical AND of just signal 164 and signal 169 to drive signal suspend_xfer 172 that in turn causes suspension of the data-frame transmit operation, and temporary closing of the loop to allow other devices to use the loop 1250 (i.e., this embodiment ignores signal 170 described below, and suspends a transfer once the limit is reached unless there are fewer remaining words than the value in register 168). In another embodiment, enable_DHD_suspend signal 170 for fairness-preserving feature 175 is also provided as an input to AND gate 171. The logical equation to suspend the transfer (the output of gate 171 is as follows:

suspend_xfer signal 172=(enable_DHD_suspend='1'
  AND (dhd_cnt_out(15:0)=dhd_max_frms(15:0))
  AND (xfr_cnt_out(26:0)≧dhd_cmpl_len(26:0)))

Thus, to preserve loop arbitration fairness, if the DHD primitive is received and read data is available to the "open" port (this port is "opened"), then this port transmits data up to the dhd_max_fims count and then closes the loop. If the transfer is near the end (i.e., less than the value in dhd_cmpil_len), this port finishes the transfer rather than closing immediately. The transfer is done so there is no need to arbitrate again. The values in dhd_max_frms and dhd_cmpl_len may be set via mode page initialization or via log-in values to make this feature more flexible.

When data frames are to be transmitted, counter 160 is reset (i.e., set to a value of zero) when a DHD primitive is received and counter 160 is then incremented by one for each data frame transmitted. When counter 160 reaches the maximum allowed value held in limit register 163 (unless the transfer is near the end), then no more data frames are transmitted until the next time arbitration for loop 1250 is won.

The "suspend_xfer" output signal 172 is used by loop control circuit 40 as an input to port A and B open control circuits 42 (see FIG. 5, and its description below) to transmit a close on the loop if the DHD has been received. Since the DHD mode otherwise allows very long transfers to disrupt the fairness of the loop, the suspend_xfer signal 172 restores or preserves loop fairness.

Figure 5:
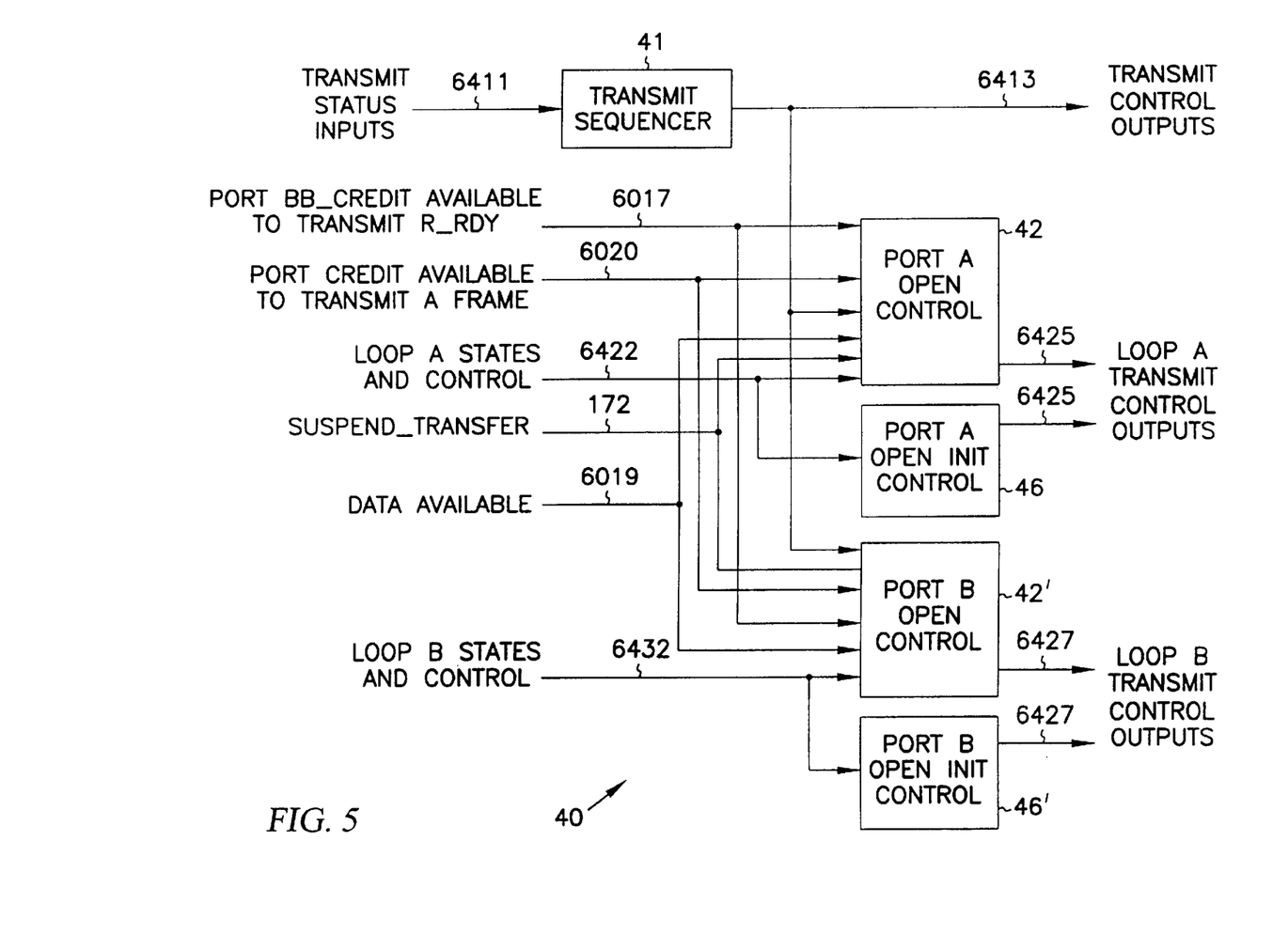
FIG. 5 is a block diagram of a fibre-channel loopcontrol circuit 40.

In one embodiment, suspend_xfer signal 172 is also provided as an input port open control state machine 42/42', and causes port open control state machine 42/42' to "close" the loop (i.e., to release control of the loop 1250 in order that other device's ports are allowed to arbitrate for the loop) thus preventing a port from unfairly keeping control of loop 1250. In some embodiments, suspend_xfer signal 172 is activated once a predetermined amount of data (e.g., number of words) are transferred. In other embodiments, suspend_xfer signal 172 is activated once a predetermined length of time lapses. In some of either of these types of embodiments, activation of suspend_xfer signal 172 is inhibited if fewer than a predetermined amount of data (e.g., number of frames) are remaining to be transferred. In some of any of the above types of embodiments, activation of suspend_xfer signal 172 is inhibited if enable_DHD_suspend signal 170 is disabled.

II. Dedicated Frame Buffer for Loop Initialization and Responses

For one embodiment of the present invention, frame buffers have been added to the third-generation application-specific integrated circuit ("ASIC") chip (the fibre-channel interface chip 110) to allow both ports to be active simultaneously. Two buffers that receive non-data frames (also called "receive-non-data-frame buffers" 53 and 53' of FIG. 1) are provided to allow commands and FCP frames (fibre-channel-protocol frames) to be received simultaneously at both ports of the node (and also to permit fill-duplex operations, i.e., receiving on one fiber of a port while transmitting on the other fiber of the same port). This allows a disc drive 100 (see FIG. 2) to receive new commands (or other non-data frames) on one port during a data transfer on the same port and/or on the other port, rather than waiting until a pause or the end of the transfer. By having the commands earlier than in conventional approaches, the present invention allows the commands to be sorted and optimized while data transfers are progressing, thus improving the performance of the system 1200.

Figure 3:
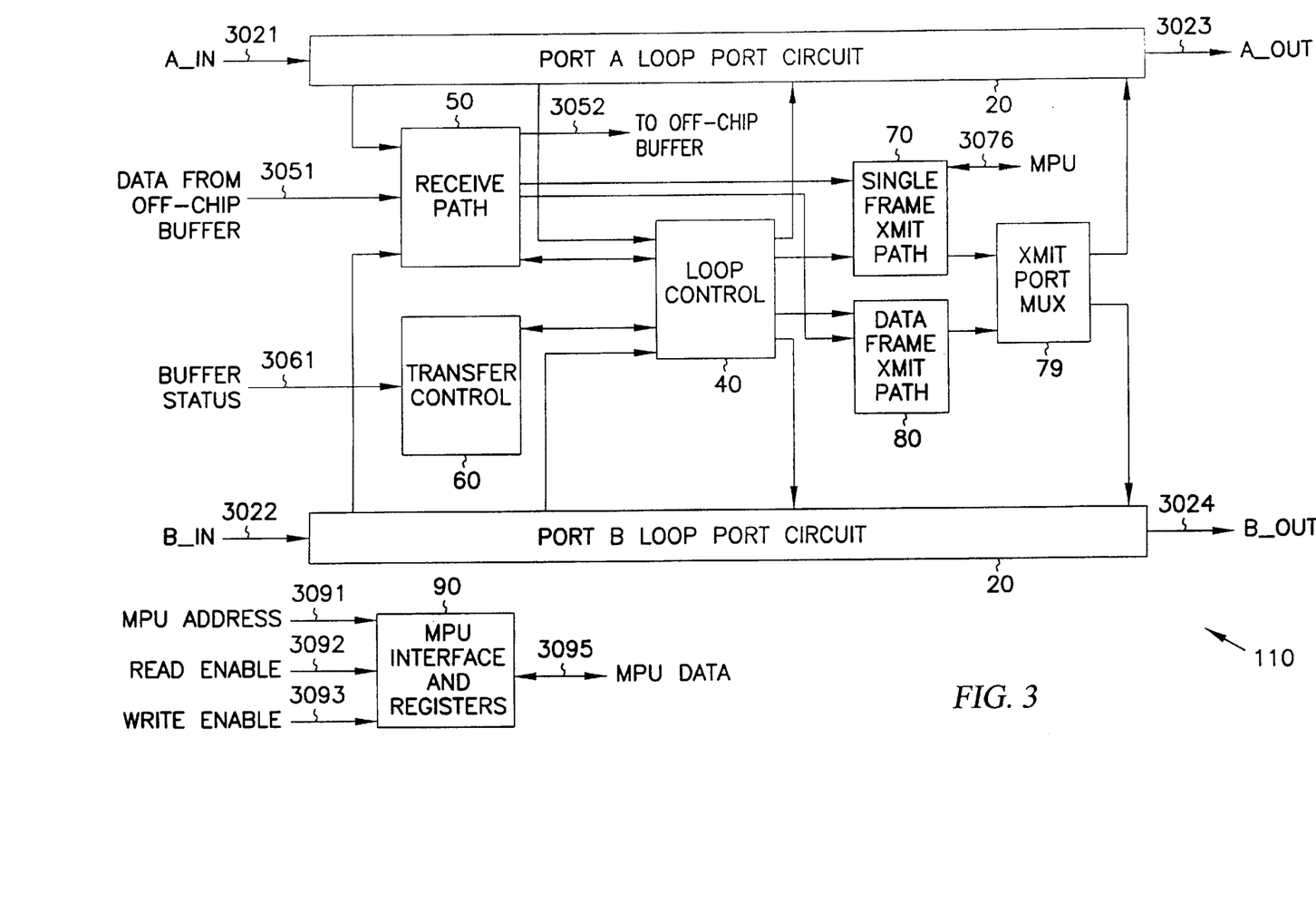
FIG. 3 is a block diagram of a fibre-channel node-interface chip 110.

FIG. 3 is a block diagram of a fibre-channel node-interface chip 110. The fibre-channel node-interface logic 110 in the present invention is responsible for the fibre-channel protocol including the arbitrated loop logic and framing logic. One embodiment is optimized for a class-3 SCSI implementation (see the FC AL specifications noted above) using only the SCSI upper-level protocol defined by the fibre-channel protocol ("FCP") standard. The fibre-channel node-interface logic 110 includes four on-chip frame buffers (53, 53', 55, and 73) to assist in dual-port and full-duplex operations, as well as to support a variety of buffer bandwidths. The fibre-channel node-interface logic 110 also interfaces to a microprocessor 112, which allows microprocessor 112 to configure the fibre-channel node-interface logic 110 and to read status information about the present condition of the fibre-channel node-interface logic 110.

The fibre-channel node-interface logic 110 includes two loop port circuits 20 (one for Port A and another for Port B, each port having a data-in interface and a data-out interface to support loop communications), loop-control circuit 40 (also called frame-transmit circuit 40), receive-path logic 50, transfer-control logic 60, single-frame-transmit circuit 70, transmit-path multiplexer ("mux") 79, data-frame-transmit-path logic 80, and microprocessor interface 90. These blocks support such functions as receive-frame processing, transmit-data-frame generation, single-frame-transmit generation, transfer control, and processor interfacing.

Microprocessor interface circuit 90 provides microprocessor 112 access to the registers and counters in the fibre-channel node-interface logic 110. (When a "microprocessor" is described, it is to be understood that such term includes any suitable programmable logic device.) The interface registers are initialized by an external microprocessor 112 prior to responding of the fibre-channel interface. Output transfers are initialized through this interface and status of received transfers is available through this interface.

The input signals for FIG. 3 include A_IN 3021 which conveys data input from the fibre channel 16 into loop port circuit 20 for Port A, and B_IN 3022 which conveys data input from the fibre channel 16 into loop port circuit 20 for Port B. DATA FROM OFF-CHIP BUFFER 3051 conveys data from off-chip buffer 111 to receive path 50. TO OFF-CHIP BUFFER 3052 conveys data to off-chip buffer 111 from receive path 50. BUFFER STATUS 3061 provides status to transfer control 60. MPU ADDRESS 3091 and MPU DATA 3095 into MPU interface 90 provide address and data, respectively, from microprocessor 112. READ_ENABLE 3092 and WRITE_ENABLE 3093 into MPU interface 90 provide enable signals from microprocessor 112. Signals MPU 3076 allow microprocessor 112 to access transmit-frame buffer 73. A_OUT 3023 conveys data to the fibre channel 16 from loop port circuit 20 for Port A, and B_OUT 3024 conveys data to the fibre channel 16 from loop port circuit 20 for Port B.

Figure 4:
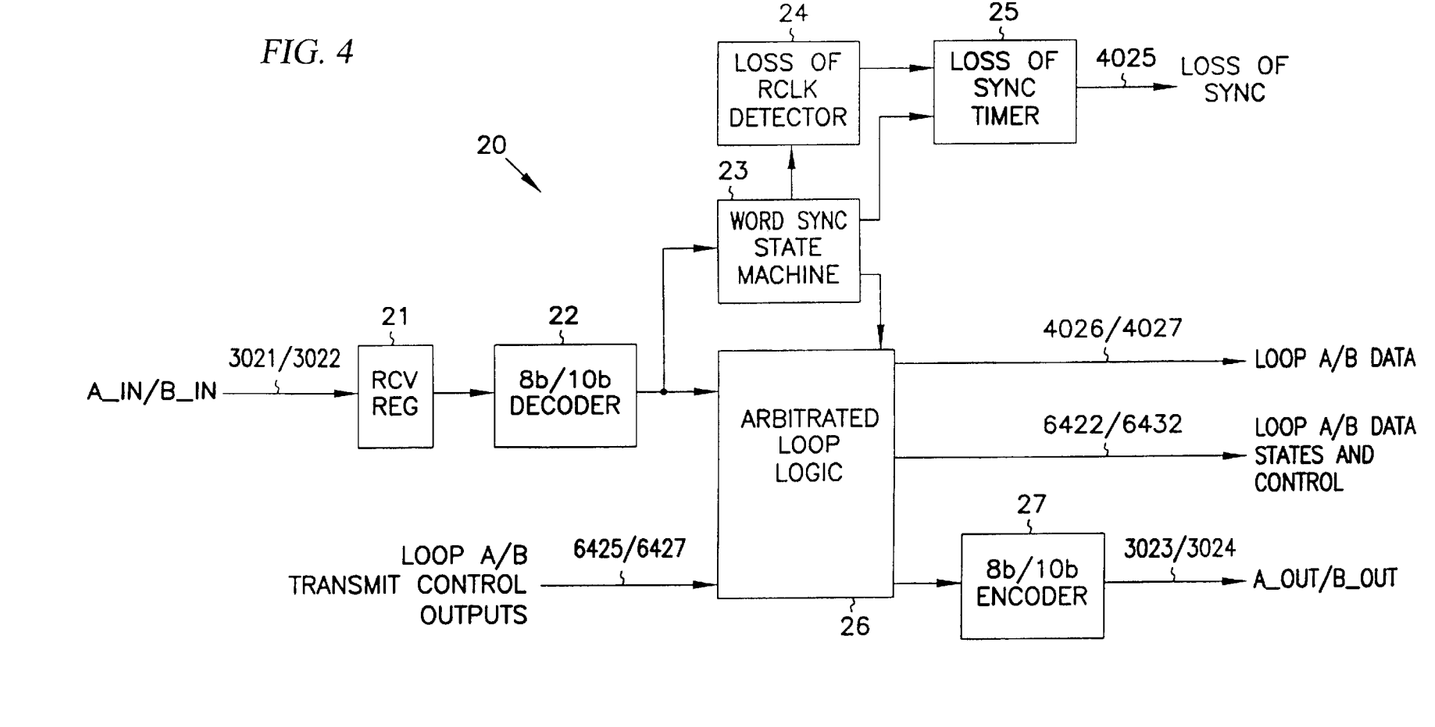
FIG. 4 is a block diagram of a fibre-channel loop port circuit 20.

FIG. 4 is a block diagram of a fibre-channel loop port circuit 20. The fibre-channel design of one embodiment of the present invention includes two identical loop port circuits 20 to support a dual-ported fibre-channel interface for direct attachment of peripherals. In one embodiment, fibre-channel loop port circuit 20 includes receive register 21, 8B/10B decoder logic 22, word-sync state machine 23, loss-of-receive-clock detector 24, loss-of-sync timer 25, arbitrated-loop logic 26, and 8B/10B encoder 27.

In one embodiment, each of loop port circuits 20 interface to external transceivers 115 (see FIG. 1) using a ten-bit data interface. In such an embodiment, the transceivers 115 serialize and deserialize serial data to and from a parallel interface (e.g., a ten-bit-wide or a twenty-bit-wide interface). In other embodiments, these transceivers 115 are integrated into chip 110. The parallel data (input from the fibre channel) are captured using receive clocks from the receiver portion of each transceiver 115, and are converted to a twenty-bit-wide format before decoding using a parallel 8B/10B decoder. The sixteen-bit data plus two k-characters (used to denote special ordered sets) are then checked for word validity before being placed in the arbitrated-loop logic 26. The output of the arbitrated-loop logic 26 is re-synchronized to the transmitter clock and may be passed to the receive-framing logic or re-transmitted on the loop 1250 through encoder 27. In one embodiment, encoder 27 converts one eight-bit character to one ten-bit character during each operation; in other embodiments, two or more eight-bit characters are converted into the corresponding number of ten-bit characters in each operation. (See U.S. Pat. No. 5,663,724 entitled "16B/20B Encoder.") The arbitrated-loop logic 26 includes a loop state machine, an ordered-set decoder, and elasticity insert and delete functions. Loop-port circuits 20 implement the Arbitrated-Loop Protocol as defined in the Fibre-Channel Arbitrated-Loop ANSI standard (i.e., FC-AL and/or FC-AL2, described above).

In one embodiment, fibre-channel data are transmitted serially and converted to ten-bit parallel data by the transceiver 115. Receive register 21 captures the ten-bit data (A_IN 3021 or B_IN 3022) from the transceiver 115 using clocks generated by the receiver portion of transceiver 115. The data are immediately converted to twenty bits wide (i.e., two ten-bit characters wide) before being passed through the 8B/10B decoder 22. Although called an "8B/10B decoder," decoder 22, in one embodiment, converts one ten-bit character to one eight-bit character during each operation; in other embodiments, two or more ten-bit characters are converted into the corresponding number of eight-bit characters in each operation.

The 8B/10B decoder logic 22 inputs the encoded data captured by the receive register 21. Two ten-bit characters are decoded in parallel to output two eight-bit characters.

Running disparity of the input characters is checked and error status is passed to word-sync state machine 23, as well as to the arbitrated-loop logic 26. Negative running disparity is forced on the next ordered set following a running disparity error. Violations to the coding rules are also checked and code-violation status is passed to word-sync state machine 23.

The loss-of-receive-clock detector 24 detects when the receive clocks from the transceiver 115 have stopped. When a "loss-of-receive-clock" condition is detected, word-sync state machine 23 is reset and data are prevented from going into the FIFO in arbitrated-loop logic 26 (a FIFO is a first-in first-out memory, typically used to interface between busses or processes having different speeds). The current-fill-word ("CFW", described more below) is transmitted until word sync is re-gained.

Word-sync state machine 23 logic monitors the input stream for word sync. Word-sync is achieved when three valid ordered sets are detected with proper byte/control character alignment, and no intervening invalid characters are detected. "Loss-of-word-sync" is defined per the FC-PH (i.e., FC-PH Physical & Signalling Interface X3T11/Project 755D/Rev. 4.3) standard. When word-sync is achieved, data are input into the FIFO in arbitrated-loop logic 26.

The loss-of-sync timer 25 is used to determine when a loss-of-word-sync condition has been present for more than one maximum frame time (since it may take up to a frame time to detect three valid ordered sets). When this timer expires, microprocessor 112 is interrupted with the LOSS-OF-SYNC interrupt signal 4025, so that it may take action.

The arbitrated-loop logic 26 includes a loop-elasticity FIFO, loop FIFO control logic, ordered set-decode logic, loop-state-machine logic, current-fill-word-selection logic, loop-output multiplexer logic, and miscellaneous functions. The loop-elasticity FIFO provides the buffering required to re-synchronize the input data (clocked by the receive clock) with the transmit clock. The loop FIFO control logic monitors the status of the arbitrated-loop logic 26 to determine whether an insert or delete operation may be required. Ordered sets are decoded by the ordered-set-recognition logic. These ordered sets include FC-PH defined ordered sets (i.e., FC-PH Physical & Signalling Interface X3T11/Project 755D/Rev. 4.3), which include frame delimiters and arbitrated-loop ordered sets. The current-fill-word-selection logic monitors the loop states and decoded ordered sets to determine the current-fill-word ("CFW"). When the arbitrated loop is enabled, a hardware state machine uses the ordered-set decodes to perform the loop functions described in the FC-AL standard (i.e., Fibre-Channel FC-AL1 Arbitrated Loop standard X3T11/Project 960D/Rev. 4.5, or Fibre-Channel FC-AL2 Arbitrated Loop standard X3T11/Project 1133D/Rev. 6.3). The inputs LOOP A TRANSMIT CONTROL OUTPUTS 6425 and LOOP B TRANSMIT CONTROL OUTPUTS 6427 provide input to arbitrated-loop logic 26 from the logic in FIG. 5. The outputs LOOP A STATES AND CONTROL 6422 and LOOP B STATES AND CONTROL 6432 control the output of the respective loops and provide status to the loop-control logic, which in turns generates requests to the loop control 40 (see FIG. 5). The outputs LOOP A DATA 4026 and LOOP B DATA 4027 provide data to the respective local ports.

In one embodiment, 8B/10B encoder logic 27 accepts the sixteen-bit data and 2 k-characters (lower k is always 0) from arbitrated-loop logic 26. In one embodiment, the inputs are encoded into two ten-bit characters which are separated and output one at a time to transceiver 115 (see FIG. 1), which converts the data to a serial stream. In other embodiments, both ten-bit characters (i.e., twenty bits) are sent in parallel to transceiver 115, which converts the data to a serial stream. The transmit multiplexer 79 (see FIG. 3) also provides status to indicate when the end-of-frame ("EOF") delimiter is being transferred, to allow the encoder 27 to select the correct type (or "flavor") of the EOF based on the current running disparity. Also, when the port is transmitting (in an Opened state) or when arbitrated-loop logic 26 is transmitting a primitive, the running disparity is forced to negative at the start of each non-EOF primitive. The output signals A_OUT 3023 and B_OUT 3024 transmit data to the respective transceivers 115 and 115'.

FIG. 5 is a block diagram of loop-control circuit 40 (also called frame transmit ("XMIT") circuit 40). Loop-control circuit 40 (see FIGS. 3 and 5) includes control logic to generate requests to the appropriate arbitrated-loop state machine (in arbitrated-loop logic 26 of Port A and Port B) as well as to generate requests to the transmit framing state machines 72 and 81 to begin transmitting frames or R_RDY's.

Transmit-data-sequencer logic 41 includes logic that is activated when a transfer is requested by microprocessor 112. Transmit-data-sequencer logic 41 monitors the transfer using input signals TRANSMIT STATUS INPUTS 6411 and generates "enables" (i.e., enable signals TRANSMIT CONTROL OUTPUTS 6413) for each stage of the transfer. This allows the transfer-ready and FCP responses to be generated without intervention of microprocessor 112.

Loop-port A/B open-control state machines 42 (Port A) and 42' (Port B) handle the case where the port is opened by another L_Port or when the loop 1250 is opened to transmit frames. This logic generates requests to arbitrate and to close the loop 1250, and requests to transmit R_RDY's and frames of various sorts, and can be configured for half-duplex or full-duplex operation.

The following conditions must be met to begin a request to arbitrate:

a request from microprocessor 112 to transmit a frame with xmit port enable, the transmitting port is in the Monitoring state, transfer-length count not zero, no request from microprocessor 112 to pause a transfer, and (non-data transfer, or data-write transfer with transfer-ready not yet transmitted with data threshold met, or data-read transfer with data threshold met and data-frame buffer threshold met).

When the port is configured for half-duplex mode, R_RDY's may be transmitted only when in the Opened state. When the port is configured for full-duplex mode, R_RDY's may be transmitted in either Opened state or Open state. Conditions that cause an R_RDY to be transmitted include "Buffer-to-Buffer Credit (BB_Credit) available and outstanding R_RDY's less than maximum BB_Credit." (Buffer-to-Buffer Credit control logic 603 issues buffer credit to the connected port to allow frames to be sent. This credit is issued by sending R_RDY's.)

When the port is configured for half-duplex mode, frames may be transmitted only when in the Open state. When the port is configured for full-duplex mode, frames may be transmitted in Open state or in Opened state if the port was opened in full-duplex mode by the frame recipient.

A request to transmit a frame is generated when all the following conditions are met:

data-frame buffer 55 has data available

Buffer-to-Buffer Credit is available (R_RDY received)

non-data transfer, or data-read transfer and transfer-length counter (in block 609) is non-zero Conditions that cause the loop 1250 to be closed (control of the communications channel to be released by a port 116) include:

no Buffer-to-Buffer Credit is available when entering the Opened state for fairness, i.e., the predetermined limit on the number of frames that can be transferred (as specified in limit register 163 of FIG. 1) is reached by DHD counter 160, and (optionally) more than the minimum length (as specified by minimum-length register 163) number of frames are remaining to be transferred, and (optionally) the enable_DHD_suspend signal 170 is active there are no outstanding R_RDY's and no more BB_Credit is available when in Opened state a processor busy request is active when the port is in Opened state the transfer has completed data-read transfer operation and data are not available a CLS primitive is received and no more BB_Credit is available a microprocessor pause request is pending and the logic is between frames In FIG. 5, loop-port A/B open-init-control state machines 46 (Port A) and 46' (Port B) handle the case of when the loop 1250 is in the Open-Init state. This logic 46 and 46' generates requests to transmit frames. There is one state machine for each port (46 and 46', respectively). These state machines generate a request to transmit a frame when microprocessor 112 requests it, and monitor for the transmission of the EOF. When the transmission is complete, a transfer-complete is generated to microprocessor 112.

The inputs to block 40 include PORT BB_CREDIT AVAILABLE TO TRANSMIT R_RDY 6017 and PORT CREDIT AVAILABLE TO TRANSMIT A FRAME 6020, LOOP A STATES AND CONTROL 6422 and LOOP B STATES AND CONTROL 6432 (see FIG. 4), and DATA AVAILABLE 6019. The outputs from block 40 include TRANSMIT CONTROL OUTPUTS 6413, LOOP A TRANSMIT CONTROL OUTPUTS 6425, and LOOP B TRANSMIT CONTROL OUTPUTS.6427.

III. Dedicated Frame Buffers for Receiving Frames

In a dual-ported fibre-channel arbitrated-loop design 1200, the buffers in on-chip frame buffer 119 may be used to manage inbound and outbound frames. Frames received and transmitted are usually stored in a large off-chip area (e.g., off-chip buffer 111) at a slower transfer rate. Even when off-chip buffer 111 is capable of the full transfer rate for a single port, for a dual-ported design the bandwidth required is much greater, adding additional cost. On-chip frame buffer 119 in the FC-AL ASIC 110 (see FIG. 1) may be configured in various ways to strike a balance between performance, silicon real estate, and cost. The present specification details the use of dedicated frame buffers 53 and 53' (components of the overall on-chip frame buffer 119) to receive non-data type frames simultaneously on each port, as well as providing a dedicated large data-frame buffer 55 (also a component of the overall on-chip frame buffer 119). In a dual-ported design according to the present invention, frames may be received on both ports 116 simultaneously. The frames are usually moved to and stored in a larger off-chip memory 111 after they are received. More information can be found in U.S. patent application Ser. No. 09/193,387 entitled "Method and Dedicated Frame Buffer for Loop Initialization and Responses."

IV. Using Fibre-Channel CRC for Data Integrity in On-Chip Memory

According to one aspect of the present invention, frame buffers that temporarily store fibre-channel frames allow frames to be received at the maximum fibre-channel-interface data-transfer rate. The frame may then be transferred to off-chip storage at a slower, more manageable rate. Various mechanisms, such as parity, CRC, or other redundancy functions, are optionally used to protect the data while they are being stored in the frame buffer.

In one embodiment, data-integrity checking is enhanced by passing the received fibre-channel cyclic-redundancy code ("CRC") through, the frame buffers with the data (i.e., the, CRC is stored into the frame buffer with the frame, and then read out with the frame at a later time), extra parity bits that would make the RAM wider may be eliminated.

V. Method and Apparatus to Reduce Arbitrated-Loop Overhead

In a fibre-channel arbitrated-loop design 1200, a node interface 1220 of loop port 116 must arbitrate for access to the loop 1250. A priority system is used to determine which port gains control of the loop 1250, and a "fairness" scheme is used to assure that ports are not starved. As a target device, the disc drive 100 usually is given a lower priority than a CPU information-handling system 1202, with the result that the drive 100 may have to wait to win arbitration until higher-priority devices complete their access. When the node interface 1220 of loop port 116 gains control of the loop 1250, it sends as many frames as possible before closing the loop 1250, in order to avoid unnecessary arbitration cycles. But when data are no longer available, the node interface 1220 of loop port 116 closes the loop 1250 to allow other ports access to the loop 1250. This is the method used in certain other controller architectures. The present invention provides a mechanism for enhancing loop performance by changing the rules for the decision of whether or not to close the loop 1250, based on data availability to the port, which thus reduces overall loop overhead.

In certain other controller architectures, when the End-of-Frame delimiter is transmitted, the port determines whether another frame is available. If data are no longer available (for example, if a full frame is not available for transmission), then the loop 1250 is closed. Data may again become available shortly afterwards, so the port must arbitrate again later and win arbitration before continuing the transfer. If this happens as the last frame of the transfer becomes available, completion of the transfer is delayed, which may result in a delay before the next command can be The present invention provides a mechanism for controller architecture designs which allows the loop 1250 to be held open by a port if data will shortly be available to the port. In one embodiment, the loop 1250 is held open in anticipation of sufficient further data becoming available to a port (to justify that port's retaining control of the loop) when both of the following conditions are met:

at least X-frames are available off-chip, and at least Y-words of data are available in the data-frame buffer 55. In one embodiment, the loop 1250 is held open if the predetermined amount of data is available (at least one-half frame on-chip and at least one frame available off-chip), but the transfer of a frame will not start until an entire frame is available on-chip.

One goal of the present invention is to hold the loop 1250 open and avoid an extra arbitration cycle when data will shortly be available to a port 116. The loop 1250 must not be held open waiting for data to become available if the wait will be for an extended period of time (for example, for the time required to perform a head switch), since this would prevent other ports on the loop 1250 from performing transfers.

Conclusion

Described above is an improved communications channel system (1200) for preserving loop fairness that includes a first channel node (1220) having one or more ports (116). Each port (116) supports and is attached to a fibre-channel arbitrated-loop serial communications channel (1250). One of the ports will arbitrate for control of that port's attached channel (1250), wherein control of the channel loop (1250), once arbitration is won, a fairness-preserving apparatus (175) causes control of the communications channel to be released based at least in part on whether a predetermined amount of use has occurred between the first port and the communications channel (1250).

In one embodiment, the predetermined amount of use includes having held control of the communications channel for a predetermined length of time.

In another embodiment, the predetermined amount of use includes having transferred a first predetermined amount of data. In one such embodiment, the system (1200) further includes a first counter (160) that monitors the amount of data that has been transferred. A first comparator circuit (162) operatively coupled to the first counter (160) causes control of the communications channel to be released based at least in part on whether the amount of data monitored by the first counter (160) reaches the first predetermined amount of data. In one embodiment, the first predetermined amount of data is held in a register (163).

In some embodiments, the system (1200) further includes a second counter (165) that monitors the amount of data that remains to be transferred. A second comparator circuit (167) is operatively coupled to the second counter (165) and inhibits release of control of the communications channel based at least in part on whether the amount of data monitored by the second counter (165) is less than a second predetermined amount of data. In one embodiment, the second predetermined amount of data is held in a register (168).

In some embodiments, the system (1200) further supports dynamic half duplex, and wherein the first counter (160) and the first comparator (162) are initialized upon receipt by the first port of a dynamic half duplex command.

In some embodiments, the first predetermined amount of data and the second predetermined amount of data are programmable amounts.

Some embodiments of the system (1200) further include a magnetic-disc-storage drive (114) operatively coupled to the first channel node (1220). A computer system (1202) includes a second channel node (1220), wherein the second channel node (1220) is operatively coupled to the first channel node (1220) in a fibre-channel loop (1250) in order to transfer data between the first and second channel nodes through the fibre-channel arbitrated-loop serial communications channel.

Another aspect of the present invention provides a communications method that includes (a) arbitrating for control of a loop of a fibre-channel arbitrated-loop serial communications channel; and (b) releasing control of the communications channel based at least in part on whether a predetermined amount of use has occurred between the first port and the communications channel.

In one embodiment of the method, the releasing step (b) further includes steps of: (b)(i) determining whether control of the communications channel has been maintained for a predetermined length of time; and (b)(ii) releasing control of the loop based on the determining step (b)(i). In another embodiment of the method, the releasing step (b) further includes steps of: (b)(iii) determining whether a first predetermined amount of data has been transferred; and (b)(iv) releasing control of the loop based on the determining step (b)(iii). In one such embodiment, the determining step (b)(iii) further includes steps of: (b)(iii)(A) monitoring the number of frames that have been transferred to provide a first value; and (b)(iii)(B) comparing the first value to the first predetermined amount of data.

In another embodiment of the method, the releasing step (b) further includes steps: of (b)(v) determining whether a second predetermined amount of data remains to be transferred; and (b)(vi) inhibiting release of control of the loop based on the determining step (b)(v).

Some embodiments of the above methods further include steps of: (c) receiving a dynamic half duplex command; and (d) initializing the determining step (b)(iii) upon receipt of the dynamic half duplex command. In some of these embodiments, the initializing step (d) further includes (d)(i) programmably setting the first predetermined amount of data and the second predetermined amount of data.

Still another aspect of the present invention provides a fibre-channel node controller system for preserving loop fairness. This system includes a fibre-channel arbitrated-loop serial communications channel (1250), a first channel node (1220) having a first port (116) attached to the fibre-channel arbitrated-loop serial communications channel (1250), wherein the first port arbitrates for control of that port's attached communications channel; and fairness-preserving means as described herein above for causing control of the communications channel to be released based at least in part on whether a predetermined amount of use has occurred between the first port and the communications channel.

It is to be understood that the above description is intended to be illustrative, and not restrictive. Although numerous characteristics and advantages of various embodiments of the present invention have been set forth in the foregoing description, together with details of the structure and function of various embodiments, many other embodiments and changes to details will be apparent to those of skill in the art upon reviewing the above description. The scope of the invention should, therefore, be determined with reference to the appended claims, along with the full scope of equivalents to which such claims are entitled.

What is claimed is:

1. A communications channel system for preserving loop fairness comprising:
   a first channel node having a first port for attachment to a serial communications channel, wherein the first port arbitrates for control of that port's attached communications channel;
   a fairness-preserving apparatus operatively coupled to the first port, wherein the first port arbitrates for control of a loop of the communications channel and, after control is achieved, the fairness-preserving apparatus causes control of the communications channel to be released based at least in part on whether a first predetermined amount of data has been transferred between the first port and the communications channel;

a first counter that monitors the amount of data that has been transferred; and a first comparator circuit operatively coupled to the first counter that causes control of the communications channel to be released based at least in part on whether the amount of data monitored by the first counter reaches the first predetermined amount of data.

2. The system according to claim 1, further comprising:

a magnetic-disc-storage drive operatively coupled to the first channel node; and a computer system having a second channel node, wherein the second channel node is operatively coupled to the first channel node in a loop in order to transfer data between the first and second channel nodes through the serial communications channel.

3. The system according to claim 1, further comprising:

a magnetic-disc-storage drive operatively coupled to the first channel node; and a computer system having a second channel node, wherein the second channel node is operatively coupled to the first channel node in a loop in order to transfer data between the first and second channel nodes through the serial communications channel.

4. The system according to claim 1, wherein the serial communications channel comprises a fibre channel arbitrated-loop serial communications channel.

5. The system according to claim 1, wherein the serial communications channel comprises a serial attached SCSI serial communications channel.

6. A communications channel system for preserving loop fairness comprising:

a first channel node having a first port for attachment to a serial communications channel, wherein the first port arbitrates for control of that port's attached communications channel;

a fairness-preserving apparatus operatively coupled to the first port, wherein the first port arbitrates for control of a loop of the communications channel and, after control is achieved, the fairness-preserving apparatus causes control of the communications channel to be released based at least in part on whether a first predetermined amount of data has been transferred between the first port and the communications channel;

a first counter that monitors the amount of data that has been transferred;

a first comparator circuit operatively coupled to the first counter that causes control of the communications channel to be released based at least in part on whether the amount of data monitored by the first counter reaches the first predetermined amount of data;

a second counter that monitors the amount of data that remains to be transferred; and a second comparator circuit operatively coupled to the second counter that inhibits release of control of the communications channel based at least in part on whether the amount of data monitored by the second counter is less than a second predetermined amount of data.

7. The system according to claim 6, further comprising:

a magnetic-disc-storage drive operatively coupled to the first channel node; and a computer system having a second channel node, wherein the second channel node is operatively coupled to the first channel node in a loop in order to transfer data between the first and second channel nodes through the serial communications channel.

8. The system according to claim 6, wherein the serial communications channel comprises a fibre channel arbitrated-loop serial communications channel.

9. The system according to claim 6, wherein the serial communications channel comprises a serial attached SCSI serial communications channel.

10. A communications channel system for preserving loop fairness comprising:

a first channel node having a first port for attachment to a serial communications channel, wherein the first port arbitrates for control of that port's attached communications channel;

a fairness-preserving apparatus operatively coupled to the first port, wherein the first port arbitrates for control of a loop of the communications channel and, after control is achieved, the fairness-preserving apparatus causes control of the communications channel to be released based at least in part on whether a first predetermined amount of data has been transferred between the first port and the communications channel;

a magnetic-disc-storage drive operatively coupled to the first channel node; and a computer system having a second channel node, wherein the second channel node is operatively coupled to the first channel node in a loop in order to transfer data between the first and second channel nodes through the serial communications channel.

11. The system according to claim 10, wherein the serial communications channel comprises a fibre channel arbitrated-loop serial communications channel.

12. The system according to claim 10, wherein the serial communications channel comprises a serial attached SCSI serial communications channel.

13. A communications method for use with a node having a first port for attachment to a serial communications channel, the method comprising steps of:

(a) arbitrating for control of a loop of the first port's serial communications channel; and (b) releasing control of the communications channel based at least in part on whether a first predetermined amount of data has been transferred, the first predetermined amount of data being determined by:

(b)(i) monitoring the number of frames that have been transferred to provide a first value; and (b)(ii) comparing the first value to the first predetermined amount of data.

14. The method according to claim 13, wherein the arbitrating step (a) further includes steps of arbitrating for control of a loop of a serial communications channel between the first port and a second port, and once control is achieved, maintaining control while:

(a)(i) transmitting an indication of space available at the second port to receive data, (a)(ii) transmitting a first amount of data from the first port to the second port, (a)(iii) transmitting an indication that the first port is ready to receive data, (a)(iv) transmitting an indication of space available at the first port to receive data, and (a)(v) transmitting up to a second amount of data from the second port to the first port.

15. The method according to claim 13, wherein the releasing step (b) further includes steps of:

(b)(iii) determining whether a second predetermined amount of data remains to be transferred;

(b)(iv) inhibiting release of control of the loop based on the determining step (b)(iii);

(c) receiving a dynamic half duplex command; and (d) initializing the releasing step (b) upon receipt of the dynamic half duplex command.

16. The method according to claim 13, wherein the serial communications channel comprises a fibre channel arbitrated-loop serial communications channel.

17. The method according to claim 13, wherein the serial communications channel comprises a serial attached SCSI serial communications channel.

18. A communications channel system for preserving loop fairness comprising:

a serial communications channel;

a first channel node having a first port that is operatively coupled to the serial communications channel;

a second channel node having a second port that is operatively coupled to the serial communications channel; and a fairness-preserving apparatus operatively coupled to the second port of the second node, wherein the first port of the first channel node arbitrates for control of a loop of the communications channel and, after control is achieved, control is maintained while: the second port of the second node transmits an indication of space available to receive data in the second node, the first port of the first node transmits a first amount of data to the second port of the second node and an indication that the first port of the first node is ready to receive data and an indication of space available to receive data in the first node, and the second port of the second node transmits up to a second amount of data to the first port of the first node, and wherein the fairness preserving apparatus causes control of the communications channel to be released based at least in part on whether a first predetermined amount of data has been transmitted from the second node to the first node.

19. The system according to claim 18, further comprising:

a first counter that monitors the amount of data that has been transferred; and a first comparator circuit operatively coupled to the first counter that causes control of the communications channel to be released based at least in part on whether the amount of data monitored by the first counter reaches the first predetermined amount of data.

20. The system according to claim 19, further comprising:

a second counter that monitors the amount of data that remains to be transferred; and a second comparator circuit operatively coupled to the second counter that inhibits release of control of the communications channel based at least in part on whether the amount of data monitored by the second counter is less than a second predetermined amount of data.

21. The system according to claim 20, wherein the first predetermined amount of data and the second predetermined amount of data are programmable amounts.

22. The system according to claim 19, further comprising:

a second counter that monitors the amount of data that remains to be transferred; and a second comparator circuit operatively coupled to the second counter that inhibits release of control of the communications channel based at least in part on whether the amount of data monitored by the second counter is less than a second predetermined amount of data, wherein the second channel node supports dynamic half duplex, and wherein the first counter and the first comparator circuit are initialized upon receipt by the first port of a dynamic half duplex command.

23. The system according to claim 22, further comprising:

a magnetic-disc-storage drive operatively coupled to the first channel node; and a computer system coupled to the second channel node, wherein the computer system on the second channel node is operatively coupled to the drive on the first channel node in order to transfer data between the computer system and the drive through the serial communications channel.

24. The system according to claim 18, wherein the serial communications channel comprises a fibre channel arbitrated-loop serial communications channel.

25. The system according to claim 18, wherein the serial communications channel comprises a serial attached SCSI serial communications channel.

* * * * *